Figure 1:
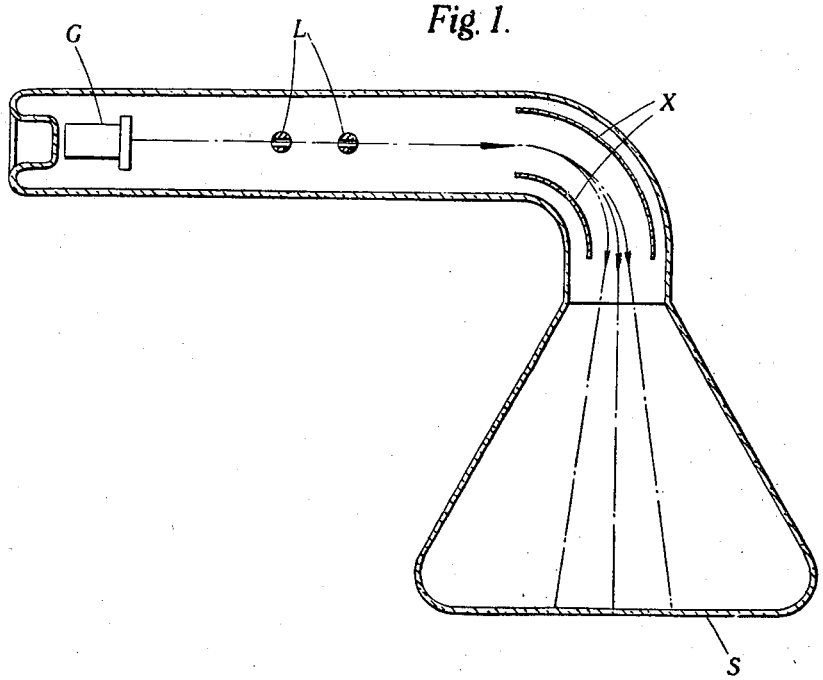

July 14, 1942.   J. H. FREMLIN   2,289,770
ELECTRON DISCHARGE APPARATUS
Filed Dec. 11, 1940    2 Sheets-Sheet 1

Inventor
J. H. Fremlin
by
Attorney

July 14, 1942.   J. H. FREMLIN   2,289,770
ELECTRON DISCHARGE APPARATUS
Filed Dec. 11, 1940    2 Sheets-Sheet 2

Inventor
J. H. Fremlin
by
Attorney

Patented July 14, 1942

2,289,770

UNITED STATES PATENT OFFICE 2,289,770

ELECTRON DISCHARGE APPARATUS

John Heaver Fremlin, London, England, assignor to International Standard Electric Corporation, New York, N. Y.

Application December 11, 1940, Serial No. 369,517
In Great Britain February 6, 1940

8 Claims. (Cl. 250—163)

This invention relates to electron discharge apparatus for the purpose of measurement at high frequencies.

There are a number of difficulties inherent in the measurement of ultra-high frequencies, and measuring instruments which have so far been developed cannot be regarded as so satisfactory as those used for low frequencies. The measurement of power can be done in a fairly reliable way, but the measurement of current and of voltage can only be done with the absorption of a considerable amount of power.

The electron discharge apparatus of the invention is adapted to measure ultra high frequency voltage without the absorption of appreciable power. Apparatus of the usual cathode ray tube type employing deflection control of the electron beam have the drawback that as the frequency increases and consequently the time of flight of the electron beam between the deflecting plates increases relatively to the period of oscillation, the process of deflection begins to absorb increasing amounts of energy. This means that although at low frequencies the cathode ray system can be regarded as absorbing as little power as an ordinary electro-static voltmeter, at high frequencies it begins to absorb considerable amounts of energy. Furthermore, the capacity between the deflection plates is appreciable, and this has the effect of taking larger and larger high frequency currents as the frequency increases, which is usually inconvenient.

The system now proposed does not employ variable deflection voltages to control the electron beam, but instead uses the velocity modulation principle, to separate the electron beam into fast and slow electrons travelling on the same straight line. After passing the controlling system, this beam, containing electrons of varying velocities, is passed through a transverse magnetic or electric field, then the deviation of the beam, which depends on the velocity of the electrons, will depend on whether or not an impressed signal exists. In the absence of any radio frequency voltage on the controlling system, the electron beam will give a sharp spot on the final fluorescent screen. If however a radio frequency voltage exists in the controlling system, this spot will be spread out in a line whose length will be proportional to the amplitude of the impressed voltage. The sensitivity of this device depends both on the controlling system itself and on the magnetic or electric fields used to deviate the electron beam after it has passed through the controlling system. As the strength of the deflecting field is increased, the sensitivity will be increased. For practical reasons, it is not usually convenient to deflect the unmodulated beam through more than 100 or 120 degrees, and it would appear that this gives a limit to the increase in sensitivity which can be obtained by increasing these fields. It is possible however by using magnetic and electric fields together in such a way as to oppose each other, to obtain as high a degree of sensitivity as is desired. The two fields can be so arranged as either to leave the initial spot undeviated or to deviate it through any convenient angle. Electrons with velocities differing from the velocity of the undeviated beam will then be affected differently by the magnetic and electric fields, and will suffer a resulting deviation proportional to the strength of these fields.

Two arrangements embodying the invention are shown respectively in Figs. 1 and 2 and Figs. 3 and 4 of the accompanying drawings.

Figure 2:
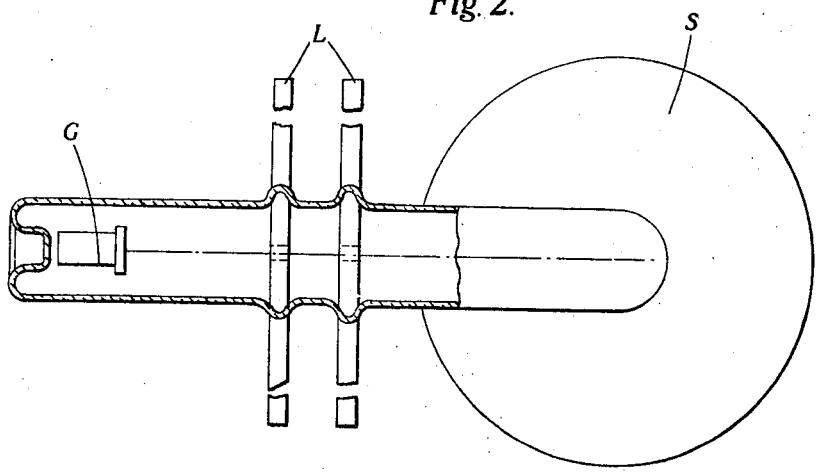

As shown in Figs. 1 and 2 a normal cathode ray gun G is used and is followed by a pair of Lecher wires L which cross the cathode ray tube, and whose common plane contains the axis of the electron gun. Each wire of the Lecher pair is split in such a way as to allow the electron beam to be transmitted effectively through the wire. The electron beam, in crossing the gap between the Lecher wires, will be "velocity modulated" if there is radio frequency voltage on the Lecher wires. This process, so long as the gap between the wires is sufficiently small, will not absorb any power from the oscillation. If the gap between the wires is so large that the time of flight of the electrons between them is an appreciable part of the cycle, a finite transfer of power between the electron beam and the oscillation would occur. This can be made either positive or negative. It will not usually be necessary, however, to have the distance so large, because if, for example, the initial velocity of the electron beam corresponds to a rise of potential of 2,500 volts, and we have an oscillation corresponding to a wavelength of 20 cm. on the wires, then the electrons would travel 2 cm. in one period of the oscillation. The gap between wires can of course very easily be made considerably less than this, and the transfer of power therefore between the electron beam and the oscillation will be negligibly small.

The velocity modulated beam passes to a deflecting system shown as comprising a pair of curved plates X between which a constant voltage is maintained.

When the Lecher wires are excited the electrons being of different velocity are deflected to different degrees by the plates X and a luminous line appears on the fluorescent screen S proportional to the voltage upon the Lecher wires.

The Lecher wires form a low loss circuit which may be connected to any two points between which it is desired to measure an ultra high frequency voltage and which, in view of the low loss, can be given a high effective impedance. Thus the arrangement forms a useful means of measuring the amplitude of oscillation at very high frequencies, which would not be possible using an ordinary cathode ray tube.

Figure 3:
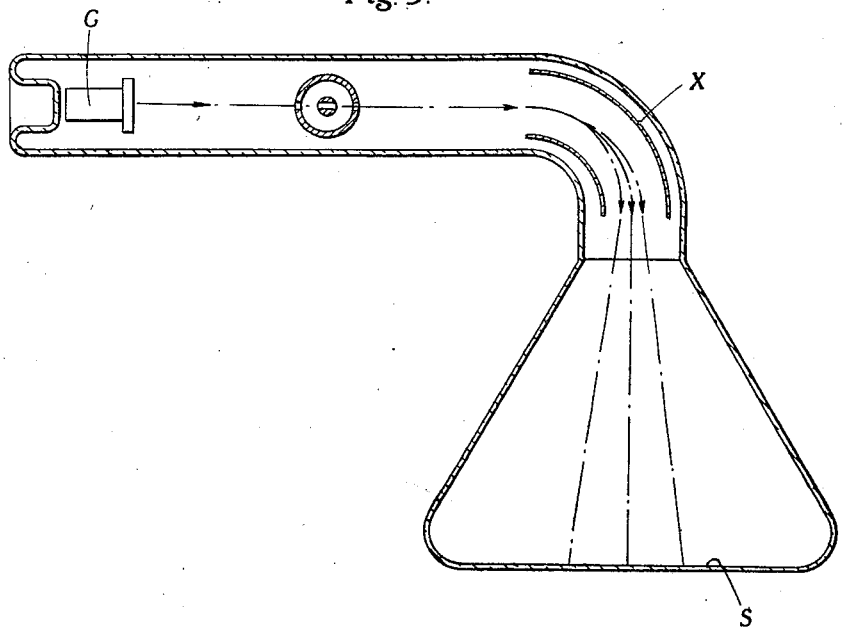
Figure 4:
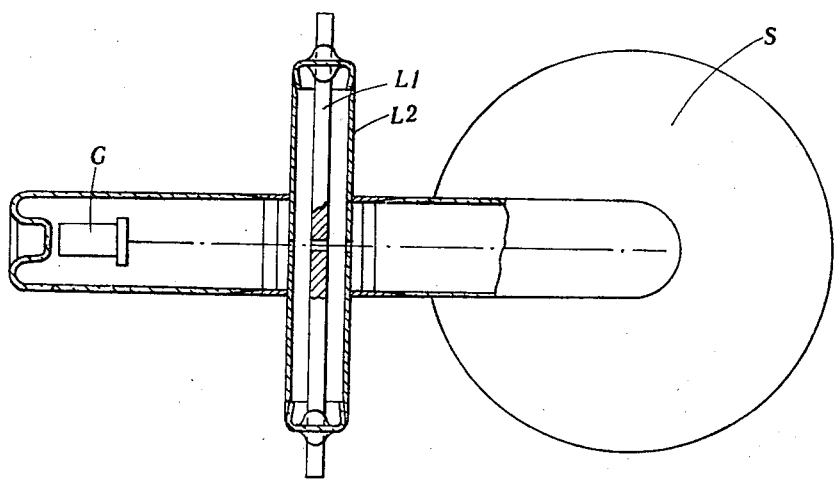

Another method by which the control of the beam can be obtained is that illustrated in Figs. 3 and 4, in which instead of providing a pair of Lecher wires to cross a cathode ray tube, a coaxial line L, L2 is disposed to cross the tube, again with slots so placed that the electron beam crosses the axis of the line. In this case, if the coaxial line carries an electro-magnetic oscillation, the electron beam will be controlled twice: first in the gap between the outer cylinder and the inner cylinder, and then, after traversing the inner cylinder along the diameter, between the inner and outer cylinders. It is thus possible for the same impressed voltage to get twice the sensitivity as was obtained in the case of the Lecher pair. On the other hand, a coaxial line normally has a rather lower impedance than has the Lecher pair, and it is necessary when a coaxial line is used that the diameter of the inner cylinder should be sufficient to ensure that the time of flight of electrons within it is of the order of ¼ to ½ a period of the oscillation if the best efficiency is to be obtained.

A further possibility is that of using instead of a Lecher wire pair, three wires in the same plane equally spaced, in which the centre wire oscillates with respect to the other two. This system has been described by K. Morita in the "Electro-Technical Journal," which is the journal of the Electrical Engineers of Japan, published at Tokio, volume 3, page 164, where it is shown that the three-wire system has considerably lower losses than can be obtained by a Lecher pair, and this system has in its application to the apparatus of the invention the additional advantage as compared to the Lecher pair of giving greater sensitivity, in the same way as was mentioned in the case of the coaxial line. It may of course be necessary to tune the circuit consisting of Lecher wires or of coaxial lines, by means of a sliding bridge to the particular wavelength at which it is desired to make measurements if it is not convenient to include the tube in an existing pair of leads. It is necessary also to calibrate the tube or other part of the apparatus carrying the voltage to be measured, as in the case of any measuring instrument, as calculation would not give sufficiently accurately the deviation of the light spot due to a given voltage on the controlling system, and furthermore the voltage actually on the working part of the controlling system may be proportional rather than equal, to the voltage at the points where the system is joined to the circuit on which measurements are to be made.

What is claimed is:

1. Electron discharge apparatus for measurement at high frequencies comprising a cathode ray tube including an electron gun, a tuned circuit of small parallel conductors passing transversely of the axis of said gun for the velocity modulation of the electron beam, deflecting means such as a pair of plates for setting up a constant deflecting field for the velocity modulated beam, said deflecting means being disposed directly after said tuned circuit, and a fluorescent screen disposed in the path of said beam after passing said deflecting means.

2. Electron discharge apparatus according to claim 4 including means for setting up opposed electrostatic and electromagnetic deflecting fields for the velocity-modulated beam.

3. The method of measuring a high frequency voltage which comprises generating a beam of electrons, velocity modulating said beam of electrons, and subjecting said beam of electrons to a constant deflecting field directly after said velocity modulation.

4. Electron discharge apparatus for measuring high frequency conditions comprising an electron gun generating a beam of electrons, resonant means in the path of said beam and apertured to permit passage of said beam of electrons through said resonant means, whereby the electrons in said beam may be velocity modulated in accordance with the resonant condition of said resonant means, deflecting means setting up a constant deflection field in the path of said beam, said deflecting means being disposed directly after said resonant means, and a fluorescent screen disposed in intercepting relationship with respect to the electrons of said beam after passing said deflecting means.

5. An electron discharge device according to claim 4, wherein said resonant means comprises a coaxial line having inner and outer conductor means with diametrically aligned apertures therein.

6. An electron discharge device according to claim 4, wherein said resonant means comprises three wires extending transversely of the path of said beam, said wires being apertured to permit passage of electrons of said beam therethrough.

7. Electron discharge apparatus for measuring high frequency voltage conditions comprising an electron gun supplying a beam of electrons, a pair of Lecher wires extending transverse to the path of said beam, said wires being apertured to permit the passage of electrons of said beam therethrough, whereby the electrons in said beam may be velocity modulated in accordance with the voltage condition on said Lecher wires, deflecting means setting up a constant deflection field in the path of said beam, said deflecting means being disposed directly after said Lecher wires, and a fluorescent screen in intercepting relationship with respect to the electrons of said beam after passing said deflecting means.

8. An electron discharge device according to claim 7, further comprising means for tuning said Lecher wire pair including sliding bridge means.

JOHN HEAVER FREMLIN.